March 20, 1934.　　　P. LANHAM　　　1,951,797
METER
Original Filed May 18, 1929　　4 Sheets-Sheet 1

Fig. 1.

Inventor
Paul Lanham
By O'Neill & Bunn
Attorneys

March 20, 1934.  P. LANHAM  1,951,797

METER

Original Filed May 18, 1929  4 Sheets-Sheet 2

Fig. 2.

Inventor
Paul Lanham
By O'Neill & Bunn
Attorneys

March 20, 1934.　　　P. LANHAM　　　1,951,797
METER
Original Filed May 18, 1929　　4 Sheets-Sheet 3

Inventor
Paul Lanham
By O'Neill & Bunn
Attorneys

March 20, 1934.  P. LANHAM  1,951,797
METER
Original Filed May 18, 1929   4 Sheets-Sheet 4

Inventor
Paul Lanham
By O'Neill & Bunn
Attorneys

Patented Mar. 20, 1934

1,951,797

UNITED STATES PATENT OFFICE 1,951,797

METER

Paul Lanham, Lanham, Md.

Application May 18, 1929, Serial No. 364,151
Renewed July 23, 1932

29 Claims. (Cl. 234—34.5)

The invention relates to certain improvements in recording meters of the general type shown in my prior Patents No. 1,075,427 of October 14, 1913, and No. 1,334,912 of March 23, 1920, associated with an integrating meter for producing on a chart the indication and registration of pressures and velocities produced by the flow of fluids in conduits and registering in the integrating meter the total volume of flow, the object of the invention being to produce an instrument of high efficiency and exceptional accuracy, that is at the same time of sturdy construction and not liable to damage or derangement under the ordinary conditions of use.

The invention is illustrated in the accompanying drawings, in which:—

Referring to the drawings, 1 indicates the base or foundation board adapted to be secured to a wall or other suitable support, to which is secured, preferably in spaced relation, the main panel 2 upon which the mechanism is carried, the space between the baseboard and the panel constituting a convenient receptacle for the primary batteries which constitute the source of electrical energy employed by the apparatus.

Mounted on the face of the panel is a clock mechanism 3, which operates a spindle 4 to which is removably secured a removable chart 5 of the usual type employed in recording devices of this general character.

Bolted to the front of the panel 2 is a casting 10 having an upward extension 10' comprising vertical legs and a horizontal cross piece. Carried by the casting 10 is a manometer or U tube device comprising two tubular members 18, 18', which are preferably made of durable transparent material, such as bakelite, the upper ends of the tubes engaging sealing washers 19 seated in counterbored recesses 11 in the casting 10, the lower ends of the tubes engaging similar washers 19' in counterbored recesses 14 in a bottom plate 12, which latter is secured to the casting 10 by suspension and spacing bolts 13, the bottom plate 12 being provided with a channel 16 connecting the counterbores 14, therefore establishing communication between the two tubular sections of the manometer. A suitable drain opening 15 is formed in the bottom plate communicating with the cross channel 16 and normally closed by a screw plug 17. The upper portions of the manometer tubes are adapted to be connected to the Venturi tube or other device employed for manifesting the velocity of flow of the fluid, by openings 20 and 21, respectively, adapted to receive nipples to which piping leading to the Venturi tube or other device is connected. The casting 10 is also provided with two channels 22 and 23 connecting with the counterbores and, therefore, with the tubular members of the manometer and opening through the front face of the casting where they receive pet cocks 22' and 23' by means of which the tubular members of the manometer may be vented.

Clamped in a circular opening in one end of the casting 10 is a cylinder block, having an upper bore 32 open at its top and a lower and larger bore 31 which is closed at its bottom by a suitable screw cap 33. One side wall of the cylinder block is provided with a threaded inlet nipple 34 communicating with a duct 35, which opens into the upper portion of the larger cylinder 31, and a vertical duct 36 which opens into the lower portion of the cylinder 31, the upper throat of the duct 36 being controlled by a needle valve 37, which regulates the admission of motive fluid to the cylinder and, therefore, regulates the rate of operation of the motor of which the differential cylinders constitute a part. Suitable differential pistons operate in the large and small cylinders 31 and 32, the pistons being rigidly connected to a piston rod 40, which is provided with an integral flange 41, which supports a packing or cup washer 46, which is clamped against the flange by one end of a spool 45, which engages the lower portion of the piston rod 40, the lower flange of the spool constituting an abutment support for the cup leather or washer 47, which constitutes the packing for the piston, operating in the larger bore 31 of the cylinder, said packing being secured in place by an annular plate 48, which, in turn, is secured by a set nut 49 threaded to the lower end of the piston rod. The lower portion of the piston rod is provided with a bore 42 which extends from the lower end of the rod to a point above the flange 41 where it opens laterally into the upper cylinder 32 above the piston therein, the lateral vent being indicated at 43. The upper portion of the piston rod is provided with a smaller bore which extends throughout the upper length of the piston rod and is adapted to receive and guide the stem 50 of a small valve 51, which cooperates with the seat at the lower end of the bore 42 in the lower portion of the piston rod. Adjustably connected to the upper end of the valve stem 50 is an annular plate 52 of steel, which constitutes the armature of an electromagnet 53 mounted on the upper end of the piston rod and through which the valve stem 50 extends. Interposed between the armature 52 and the face of the electromagnet 53 is a spring 54, which normally tends to force the armature away from the face of the magnet and, therefore, to lift the valve rod 50 and close the valve 51 against its seat. The armature 52 is formed as a permanent magnet, so that, when it has been attracted by the magnet 53 when the latter is energized, it will remain in contact with the face of the magnet when the magnet is de-energized, but will be forced away from the face of the magnet when the magnet is reenergized by current flowing in the opposite direction to that which caused the attraction of the armature.

Figures 3, 4, 5, 6:
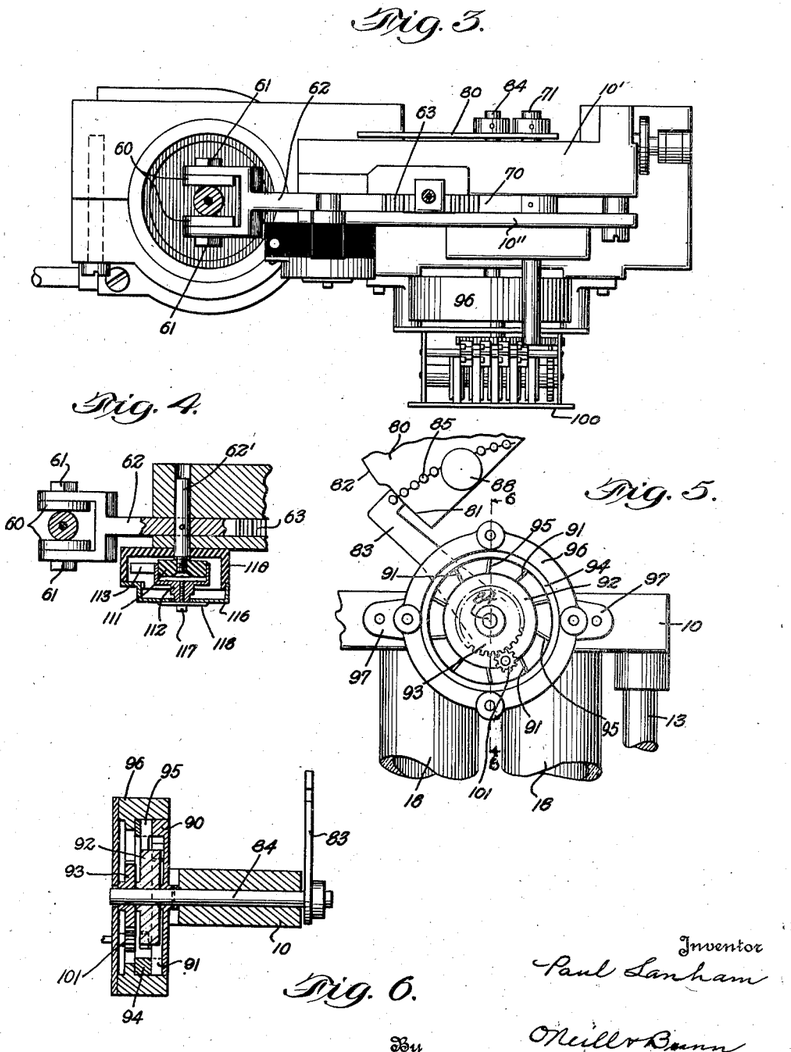
Fig. 3 is a plan view.
Fig. 4 is a fragmentary plan view, partly in section, illustrating the construction of the switch mechanism.
Fig. 5 is a fragmentary front elevation showing the construction of a special form of clutch.
Fig. 6 is a section on line 6—6 of Fig. 5.
Figure 7:
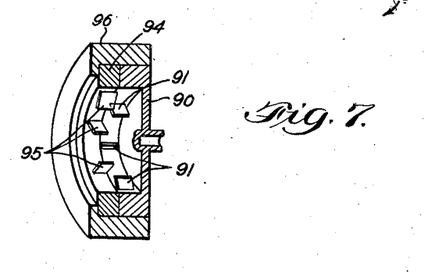
Fig. 7 is a sectional perspective of part of the clutch mechanism.

Pivoted to lugs on the flange 41 carried by the piston rod are two parallel connecting rods 60, which are connected by pivots 61, 61 to the forked end of a rock lever 62 carrying a cross pin 62' fastened thereto and which is journaled in bearings in the upper cross member of the casting section 10' and in a face plate 10", which is secured to and spaced from the casting section 10', as more particularly shown in Fig. 3. The outer end of the rock lever 62 is formed as a toothed segment 63, which engages and serves to reciprocate a rack bar 64 which has a longitudinal bore in which is adjustably mounted a tube 65 carrying a conductor wire, insulated from the tube and terminating in a platinum wire 66 projecting from the lower end of the tube, which platinum wire in the operation of the apparatus is moved into and out of contact with the surface of the mercury in the tubular section 18 of the manometer. The tube 65 passes through a stuffing box or gland 69 threaded into an opening in the block 10 in alignment with the central axis of the tubular section 18 of the manometer. The upper end of the wire extends beyond the end of the tube 65 and is provided with a terminal 67 adapted to receive a connecting clip or clamp to establish connection through the wire within the tube. The upper portion of the tubular member 65 is screw threaded to engage an internally threaded counter-bore 65' in the rack bar 64, whereby the tube 65 may be adjusted up or down in the bore of the rack bar, in fixing the zero position of the contact apparatus, which is determined when the mercury in the two tubular sections of the manometer stands at the same level and the lower end of the platinum contact 66 just touches the surface of the mercury. When such adjustment has been effected, the tube 65 is locked in its adjusted position by a set nut 68.

Journaled in bearings in the members 10' and 10" of the frame is a cross shaft 71 upon the outer end of which is mounted the pen arm 73 carrying a pen or marking implement 74, which cooperates with the chart and marks thereon the permanent record, in the manner and form described in my prior Patent No. 1,334,912. Fast to the shaft 71 and meshing with the rack bar 64 is a segment 70, so that, as the rack bar 64 is moved up and down by the operation of rock lever 62 and toothed segment 63, a corresponding rocking movement will be imparted to the toothed segment 70 and the shaft carrying the pen arm.

Also fast to the shaft 71 is a cam plate 80, the cam face of which comprises two sections, the first 81 being the arc of a circle struck from the axis of rotation of the cam plate as a center, and the second 82 being a parabola of other curve as required. Cooperating with the cam face of the plate 80 is a rock lever 83, having an angular bend at its outer end, which engages the cam face of the plate 80 and is swung on its pivot in one direction by the engagement with the shaped face 82 of the cam, and is moved into engagement with the circular face 81 of the cam by means to be hereinafter described. The rock lever 83 is fast to a shaft 84, which is journaled in a bearing formed in the block or casting 10. Locked to the shaft 84 is a disk 90 having a peripheral flange in which is fixed a series of spaced steel tongues 91, which are of uniform length and extend inwardly to normally engage the peripheral surface of a circular disk 92, which is loose on the shaft 84 and to which is secured a pinion 93. The disk 90 fits into a generally annular casting 96, which is secured to the block 10 by eared lugs 97 and constitutes a clutch casing as well as a support for an integrating meter. Also mounted in the casting 96 is an annulus 94, which carries a second set of spring blades 95, which likewise engage the surface of the disk 92. The two sets of blades 91 and 95 are disposed in series about the periphery of the disk 92 and are in constant contact with the peripheral surface of said disk and are so inclined with respect to said peripheral surface as to effect a positive rotation of the disk and the attached pinion 93, when the rock lever 83 is moved by the cam 80, and to positively lock the disk 92 against any rotary movement in the opposite direction. It will be seen, therefore, that the elements 90, 91, 94, 95 and 92 constitute a positive clutch mechanism that is without lost motion or back lash and the rocking movement imparted by cam 80 to rock lever 83 will be transmitted accurately to gear 93, but that the reverse or return movement of the lever 83 will not, in any way, affect gear 93. Mounted on the casing 96 is a totalizing register 100, which is of the ordinary type employed in indicating the flow of liquids, such as water, having the pinion 101 on the shaft of its primary or units indicator meshing with the pinion 93, which, as before stated, is loosely mounted on the shaft 84 and is actuated by the special construction of clutch which is devoid of lost motion or back lash, so that the movements of the cam plate 80 will be reproduced commensurately in the movement of the units indicator of the integrating meter.

The rock lever 83 is, as stated, moved by the upper section 82 of the cam plate 80 to actuate the standard integrating meter and special means are provided for returning the rock lever to its initial position, which is that in which it is in engagement with the circular portion 81 of the cam. To effect this return of the rock lever, the latter is connected by a chain or similar flexible means 85 to an adjustable screw 86 mounted on the frame member 10', which screw is locked in its adjusted position by set nut 87. Mounted on the face of the cam plate 80 to engage the chain, when the cam plate is approaching its highest position, is an abutment or roller 88, which takes up the slack of the chain and draws the angular end of the rock lever 83 into engagement with the circular portion 81 of the cam plate, so that the rock lever is in position for a subsequent operation by the parabolic section 82 of the cam. During this return movement of the rock lever 83, the shaft 84 is rotated thereby and with it the disk member 90, whose spring fingers 91, however, ride idly over the surface of the disk 92, while said latter disk is held rigidly against reverse movement by the spring fingers 95.

Figure 2:
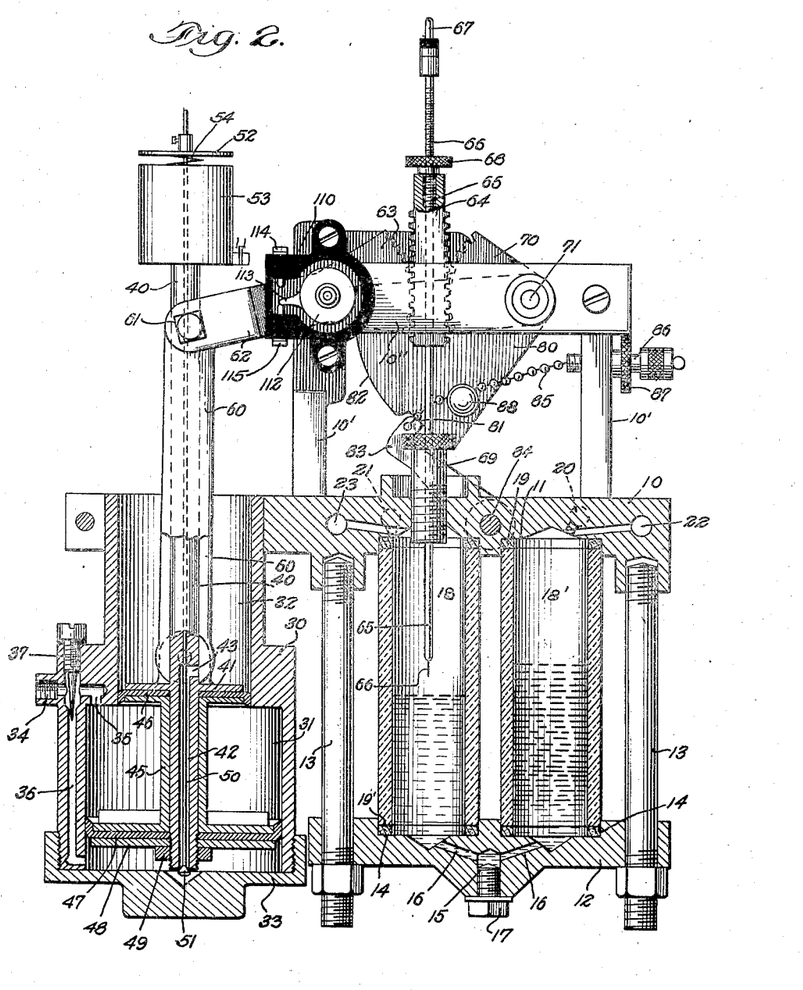
Fig. 2 is a front elevation, partly in section, of the operating parts of the mechanism with the chart and recording pen omitted.
Figure 8:
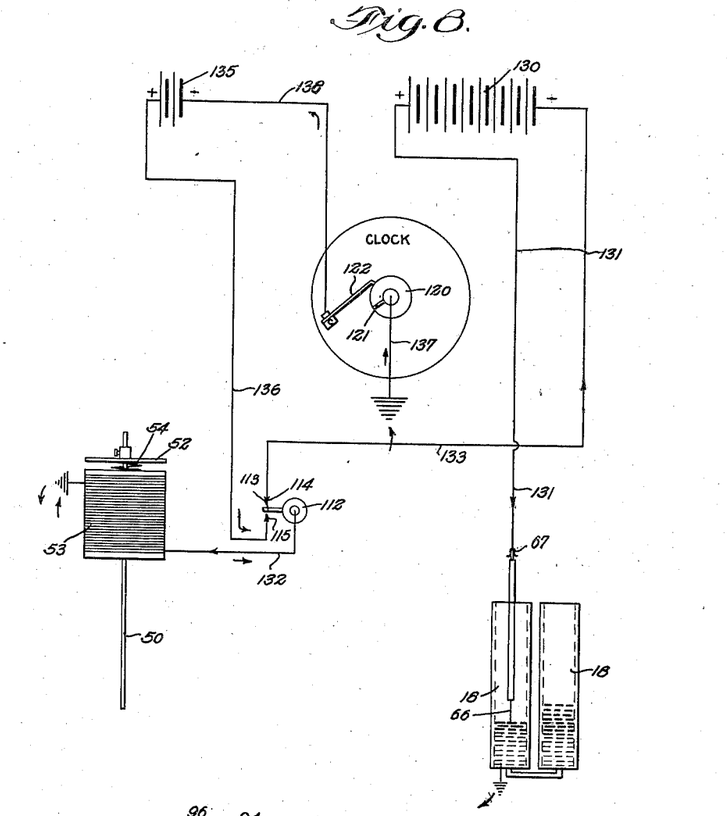
Fig. 8 is a diagrammatic view of the circuits.

The circuits controlling the electromagnet 53 and, therefore, the operation of the differential piston of the motor, are illustrated in diagram in Fig. 8 and these circuits are controlled by three sets of contacts, to wit, first, the platinum terminal of the wire mounted in the tubular rod 65 carried by the rack 64 and which engages the mercury in the manometer, second, a rotary contact 121 carried by an element of the clock train, or a supplemental gear connected therewith and indicated at 120, which contact 121 is connected to the ground and is adapted to be engaged by a suitable spring contact 122 mounted on the clock mechanism, and third a special type of switch which is actuated by the rock lever 62. This latter switch is illustrated in detail in Figs. 2 and 4 and comprises an insulated base 110, which constitutes the casing for the switch and is mounted on the cross bar 10″. Fixed to the end of the pintle 62′, which is fast to the rock lever 62, is an annular friction block 111, which is engaged by the cap-like member 112 of switch arm 113, which oscillates between fixed contact members 114 and 115 mounted in the insulated casing 110 and which are provided with clamping nuts to secure the lead wires thereto. A suitable cover 116 is provided for the casing 110, which cover is secured in place by a screw 117 and washer 118, the screw engaging a threaded opening in the top of the cap 112, said screw also constituting a terminal connection or binding post for the circuit wire leading to the switch arm 113.

Figure 1:
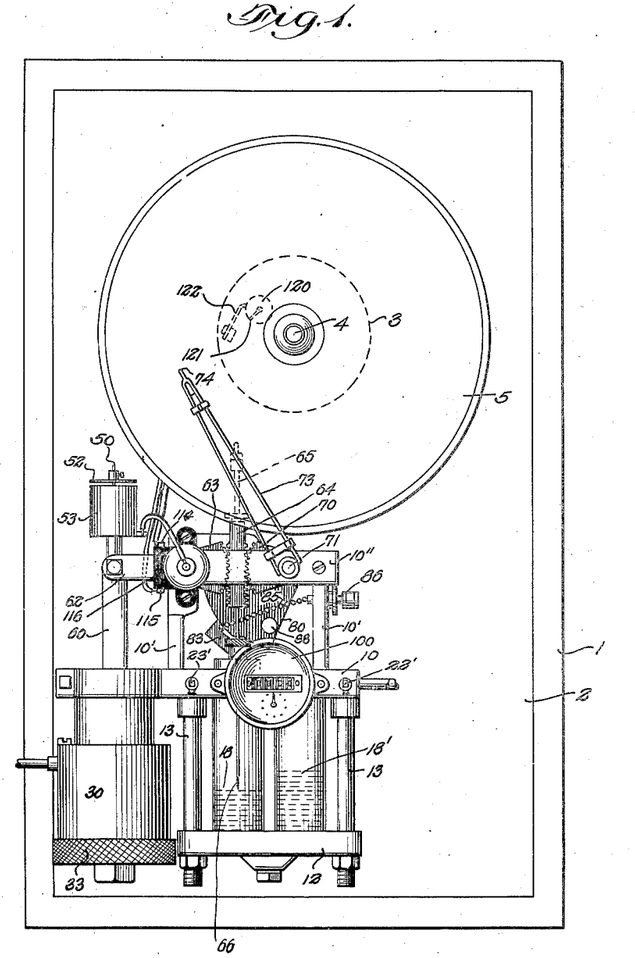
Fig. 1 is a front elevation of the apparatus.

The apparatus as described operates as follows: The respective tubular members 18 and 18′ of the manometer or U tube are connected by way of the inlet openings 20 and 21 with the Pitot tube, Venturi throat, orifice plate, weir or other device commonly employed for measuring the rate of flow of fluids and the pen cooperating with the chart and the platinum wire 66 on the reciprocating rod 65 adjusted to their zero positions, as will be understood by those skilled in the art. The pistons of the differential motor will be at the bottom of their stroke. When the differential pressures produced by the Pitot tube or similar device are delivered to the respective tubular sections of the manometer above the mercury column in the latter, the preponderant pressure in the tubular section 18 will force the mercury down and a corresponding rise in the mercury in tube 18′ will occur. Fluid pressure admitted to the motor by way of inlet 34 passes at once to the upper side of the piston in the larger cylinder through the port 35 and passes gradually past the needle valve 37 by way of duct 36 and into the portion of the cylinder 31 below the piston therein. As the small valve 51 is closed against the inlet to the duct or central bore 42 in the piston rod, the fluid pressure gradually increases on the lower side of the piston in the large cylinder 31 and, as the fluid pressure in the cylinder above the piston also acts upon the lower face of the piston in the smaller cylinder 32, both pistons are caused to gradually rise, carrying with them the connecting rods 60, which rock the pivoted lever 62, causing the toothed segment 63, forming the other end of said lever, to move the rack 64 downward and with it the rod 65 carrying the platinum wire contact 66. The first part of this movement of the lever 62 causes the switch arm 113 to move into engagement with fixed contact 114, the friction between the disk 111 and the cap 112 of the switch arm being sufficient to effect this movement and permitting continued rocking movement of the lever 62 and its pivot 62′ without imposing any undue strain on the switch arm 113. The downward movement of the rack bar 64 actuates the toothed segment 70 to swing the latter downward and to rotate the shaft 71 fixed thereto in an anti-clockwise direction, which shaft swings the pen arm 73 over the chart to trace a fine line record of the extent of movement of the motor, which latter will be determined by the engagement of the platinum contact 66 with the top of the mercury column. As the cam 80 is rigidly secured to the shaft 71, the swinging movement of the latter will cause the cam plate also to be swung downward or in an anti-clockwise direction, as viewed in Figs. 1 and 2, causing the lever arm 83 to pass out of contact with the circular portion 81 of the cam onto the parabolic section 82, thereby imparting a partial rotation to the shaft 84, which, through the special clutch mechanism rotates the disk 92 and the pinion 93, which latter drives the pinion on the shaft of the units indicator of the standard integrating meter 100, causing a movement of the indicator exactly commensurate with the movement of the rock arm 83, and, therefore, properly commensurate with the movement of the contact rod 65 and the pen arm. The upward movement of the pistons in the motor will continue until the rack bar 60 has been moved downward by the segmental gear 63 and the end of the platinum wire 66 carried by the tubular rod 65 engages the upper surface of the mercury in the tubular section 18 of the manometer. This will establish a circuit through the electromagnet 53 as follows: From the positive pole of a battery of dry cells 130 by lead 131 to terminal 67 on upper end of tubular contact rod 65, through insulated wire 66 therein, to mercury column in section 18, thence through ground connection of manometer, which may be through bottom plate 12, to ground connection of magnet 53, thence through magnet 53, to lead wire 132 to switch arm 113, then to fixed contact 114 and by lead wire 133 back to negative side of battery 130. This current is sufficient to energize the magnet and to attract the permanently magnetized armature 52 thereof, which is attached to the stem 50 of the valve 51, and forces said valve from its seat and opens up the central bore or duct 42 in the piston rod, so that the fluid pressure on the under side of the piston in the large cylinder escapes through the duct 42 and the vent 43 into the smaller cylinder above the piston therein, whence it may overflow through a suitable opening or vent pipe near the top of said cylinder. The venting of the pressure on the under side of the piston in the large cylinder produces an immediate preponderance of pressure on the upper side of said piston, thereby causing both pistons to move downward in their cylinders, which downward movement causes a reverse movement of the rock arm 62, toothed segment 63, rack bar 64, toothed segment 70, pen arm 73 and cam plate 80. The initial reverse movement of the rock arm 62 will cause the switch arm 113 carried by the shaft thereof to swing out of engagement with fixed contact 114 and into engagement with the oppositely fixed contact 115, thereby breaking the circuit through the electromagnet 53 before the platinum wire 66 moves out of engagement with the mercury column and preventing the formation of sparks between the end of the wire 66 and the surface of the mercury, which would tend to foul the latter. The breaking of the electric circuit through the magnet 53, however, does not release the armature 52 because the latter being a permanent magnet will adhere to the face of the electromagnet until released by the application of a sufficient force to overcome the magnetic attraction between the armature and the magnet. Therefore, the valve 51 is kept open until the pistons reach the lower end of their stroke and until an auxiliary circuit through the electromagnet is closed by the commutator switch device 121, 122 operated by the clock mechanism, and, therefore, constituting a time operated switch which closes the circuit at regular intervals and which may be varied at will by substituting different geared connections between the clock train and the rotary element 120 of the commutator switch. When this commutator switch is closed, the circuit is established through the electromagnet in the opposite direction to that derived from the main battery 131 as follows: From the positive pole of a single dry cell 135 by lead 136 to fixed contact 115, switch arm 113, lead wire 132 through coil of magnet to ground, through ground to clock elements 120, 121, to spring contact 122, through lead wire 138 to negative pole of battery. As this current passing in an opposite direction through the electromagnet reverses the polarity of the latter, the permanently magnetized armature 52 thereof is repelled, thereby lifting the valve rod 50 and closing the valve 51, the armature being normally held in its retracted position by the spring 54. The seating of the valve 51 closes the exhaust from the portion of the larger cylinder below the piston therein and again permits the fluid pressure to build up below the large piston and initiate another upward stroke of both pistons, which will repeat the cycle of operations just described. It will be understood that the downward or return stroke of the pistons in the cylinders of the motor effects an upward movement of the rack bar 64 and the contact rod 65 carried thereby, and a clockwise rotation of the toothed segment 70, the shaft 71 carried thereby and the cam plate 80 fixed to said shaft. During this reverse movement of the cam plate 80, the rock lever 83 is disengaged from the shaped face of the cam and remains idle until the cam plate approaches the upper limit of its return movement, when the abutment or roller 88 engaging the chain 85 takes up the slack of the latter and draws the angular end of the rock lever 83 into engagement with the circular portion 81 of the cam plate. This avoids sliding contact between the cam plate and the rock lever, except during the operative movement of the cam plate to actuate the integrating meter.

From the foregoing description, it will be seen that the meter is operated at regular timed intervals, which may be varied to suit particular conditions, and that a record of the force to be measured, exemplified in the present instance as the velocity of the flow, and all changes thereof will be made by the pen or stylus on the chart and that a direct indication of the total amount, or, in the present application, the volume of the flow of the fluid in the conduit, will be indicated by the readings on the totalizing register 100, the meter readings for a given period being multiplied by a predetermined factor predicated on the cross sectional area of the conduit carrying the fluid to be measured or upon the fixed coefficients of the device in the pipe line or conduit.

It is particularly noted that the construction of the manometer element is such as to permit the same to be readily adjusted and repaired and tubes of different diameters and lengths substituted as occasion may require, and that the special form of commutator contact carried by the clock or other timing mechanism may be changed at will to vary the timed intervals of operation of the metering device, that the apparatus as a whole is devoid of complicated or delicate parts which are liable to become deranged, damaged or impaired, and that the special construction of switch operated by the rock lever carrying the primary toothed segment completely obviates the objection to the older forms of meters of this type, in which the circuit was broken between the surface of the mercury and the platinum contact, so that fouling of the mercury surface is completely avoided. It also protects the batteries against short circuit in the event that the mercury at any time rises on the platinum contact wire 66, while commutator contacts are operating, or in the event that commutator contacts are still closed when platinum wire 66 engages the mercury column.

What I claim is:

1. A meter, comprising a fluid column variable with the force to be measured, a circuit including a reciprocatory contact cooperating with said column, a reversible motor actuating said contact, means in said circuit to reverse the motor when the circuit is closed by said contact, and a second circuit including a time controlled switch to actuate said means to effect the operation of the motor to engage the contact with the column.

2. A meter, comprising an indicating means, a fluid column variable with the force to be measured, a circuit including a reciprocatory contact cooperating with said column, a reversible motor operating said indicating means and actuating said contact, means in said circuit to reverse the motor when the circuit is closed by said contact, and a second circuit including said means and a time controlled switch to effect the operation of said motor to engage the contact with the column.

3. A meter, comprising a fluid column variable with the force to be measured, a reciprocatory contact cooperating with said column, a reversible motor for actuating said contact, an electromagnet controlling the operation of said motor, a time controlled circuit for energizing said magnet to effect movement of the motor to engage the contact with the column, and a second circuit to reverse the motor when the contact engages the column.

4. A meter, comprising a fluid column variable with the force to be measured, a reciprocatory contact cooperating with said column, a reversible motor for actuating said contact, an electromagnet controlling the operation of said motor, a time controlled circuit for energizing said magnet to effect movement of the motor to engage the contact with the column, a second circuit to reverse the motor when the contact engages the column, and an indicating means operated by said motor.

5. A meter, comprising an indicating means, a fluid column variable with the force to be measured, a circuit including a reciprocatory contact cooperating with said column, a reversible motor operating said indicating means and reciprocating said contact, a circuit including an electromagnet energized by the engagement of the contact with the column to reverse the motor and withdraw the contact from the column, and a second circuit including a timed switch for energizing the magnet in an opposite sense to effect the forward movement of the motor at regular timed intervals.

6. A meter, comprising an indicating means, a fluid column variable with the force to be measured, a circuit including a reciprocatory contact cooperating with said column, a reversible motor operating said indicating means and reciprocating said contact, a circuit including an electromagnet energized by the engagement of the contact with the column to reverse the motor and withdraw the contact from the column, a second circuit including a timed switch for energizing the magnet in an opposite sense to effect the forward movement of the motor at regular timed intervals, and a two-way switch operated by the forward and reverse movements of the motor for connecting the magnet in the respective circuits.

7. A meter, comprising a fluid column variable with the force to be measured, a reciprocatory rod carrying a contact cooperating with said column, a motor, gearing connecting the motor and the contact rod, a circuit closed through said contact and column and including means to effect a reversal of the contact by the motor when said circuit is closed between the contact and column, and a second circuit including a time operated switch and the means aforesaid to effect the forward movements of said motor.

8. A meter comprising a fluid column variable with the force to be measured, a reciprocatory rod carrying a contact cooperating with said column, a motor, gearing connecting the motor and the contact rod, a circuit closed through said contact and column and including means to effect a reversal of the contact by the motor when said circuit is closed between the contact and column, a second circuit including a time operated switch and the means aforesaid to effect the forward movements of said motor, and a two-way switch operated by the gearing to connect said circuits alternately to said means.

9. A meter, comprising a recorder having a movable stylus, a fluid column variable with the force to be measured, a reciprocatory rod carrying a contact cooperating with said column, a reversible motor, gearing connecting the motor to the stylus and the contact rod, a circuit closed through said contact and column, means in said circuit to effect a reversal of the motor when said circuit is closed between the contact and column, and a second circuit including a timed switch and the means aforesaid to effect the forward movements of the motor.

10. A meter, comprising a fluid column variable with the force to be measured, a reciprocatory contact rod cooperating with said column, a reversible motor connected to said rod to actuate the same, a circuit including the column and contact and means to reverse the motor when the circuit is closed by the contact, a recorder having a movable stylus, connections between the motor and stylus effective to move the stylus in accordance with variations in the fluid column, and a second circuit including a timed switch and the means aforesaid to effect the forward movements of said motor.

11. A meter, comprising a fluid column variable with the force to be measured, a reciprocatory contact rod cooperating with said column, a reversible motor connected to said rod to actuate the same, a circuit including the column and contact and means to reverse the motor when the circuit is closed by the contact, a recorder having a movable stylus, connections between the motor and stylus effective to move the stylus in accordance with variations in the fluid column, a second circuit including a timed switch and the means aforesaid to effect the forward movements of said motor, and a two-way switch operated by the connections between the motor and the rod to connect said circuits alternately to said means.

12. A meter, comprising a recorder having a movable stylus, a fluid column variable with the force to be measured, a reciprocatory rod carrying a contact cooperating with said column, a reversible reciprocatory motor, gearing connecting the motor and rod and operating said stylus, a circuit including means to effect reversal of the motor when the contact engages the column, and a second circuit including a timed switch and the means aforesaid to effect the forward movements of said motor.

13. A meter, comprising a recorder having a movable stylus, a fluid column variable with the force to be measured, a reciprocatory rod carrying a contact cooperating with said column, a reversible reciprocatory motor, gearing connecting the motor and rod and operating said stylus, a circuit including means to effect reversal of the motor when the contact engages the column, a second circuit including a timed switch and the means aforesaid to effect the forward movements of said motor, and a two-way switch operated by the gearing to connect said circuits alternately to said means.

14. A meter, comprising a fluid column variable with the force to be measured, a reciprocatory rod carrying a contact cooperating with said column, a reversible motor including differential cylinders and pistons, fluid pressure means for moving the pistons in both directions, a valve for reversing the movement of the pistons, gearing connecting the contact rod and the piston rod, a circuit closed by the engagement of the contact with the column, an electromagnet in the circuit to operate the valve and cause reversal of the motor upon closure of the circuit aforesaid, and a second circuit including a timed switch and the electromagnet aforesaid to cause the latter to close the valve and effect the forward movements of the motor.

15. A meter, comprising a fluid column variable with the force to be measured, a reciprocatory rod carrying a contact cooperating with said column, a reversible motor including differential cylinders and pistons, fluid pressure means for moving the pistons in both directions, a valve for reversing the movement of the pistons, gearing connecting the contact rod and the piston rod, a circuit closed by the engagement of the contact with the column, an electromagnet in the circuit to operate the valve and cause reversal of the motor upon closure of the circuit aforesaid, a second circuit including a timed switch and the electromagnet aforesaid to cause the latter to close the valve and effect the forward movements of the motor, and a two-way switch operated by the gearing to connect said circuits alternately to said electromagnet.

16. A meter, comprising a recorder having a movable stylus, a fluid column variable with the force to be measured, a reciprocatory contact rod cooperating with said column, a reversible fluid pressure motor, a valve for controlling the forward and reverse movements of said motor, gearing between the motor the stylus and the contact rod to operate the stylus and rod, an electromagnet controlling the motor valve, a circuit including the column the contact rod and the magnet to cause the latter to operate the valve and effect reversal of the motor when the rod engages the column, and a second circuit including a timed switch and said magnet to cause the latter to operate the valve to effect the forward movements of the motor at timed intervals.

17. A meter, comprising a recorder having a movable stylus, a fluid column variable with the force to be measured, a reciprocatory contact rod cooperating with said column, a reversible fluid pressure motor, a valve for controlling the forward and reverse movements of said motor, gearing between the motor, the stylus and the contact rod to operate the stylus and rod, an electromagnet controlling the motor valve, a circuit including the column the contact rod and the magnet to cause the latter to operate the valve and effect reversal of the motor when the rod engages the column, a second circuit including a timed switch and said magnet to cause the latter to operate the valve to effect the forward movements of the motor at timed intervals, and a two-way switch operated by said gearing to connect said circuits alternately to said electromagnet.

18. A meter, comprising a recorder having a movable stylus, a fluid column variable with the force to be measured, a reciprocatory contact rod cooperating with said column, a reciprocating fluid pressure motor including a cylinder, a piston operating therein, a valve controlling the forward and reverse movements of said piston, an electromagnet for operating said valve and including a permanently magnetized armature connected to said valve, gearing connecting the piston with the stylus and the contact rod, a circuit including the column the contact rod and the magnet to energize the magnet and effect a reversal of the motor when the rod engages the column, a second circuit including a time switch and said magnet to cause the latter to operate the valve to effect the forward movements of the motor at timed intervals, and a two-way switch operated by said gearing to connect said circuits alternately to said electromagnet.

19. A meter, comprising a fluid column variable with the force to be measured, a reciprocatory contact cooperating with said column, a reversible motor for actuating said contact, an electromagnet including a permanently magnetized armature controlling the operation of said motor, a time controlled circuit for energizing said magnet to effect movement of the motor to engage the contact with the column, and a second circuit to reverse the motor when the contact engages the column.

20. A meter, comprising a fluid column variable with the force to be measured, a reciprocatory contact cooperating with said column, a reversible motor for actuating said contact, an electromagnet including a permanently magnetized armature controlling the operation of said motor, a time controlled circuit for energizing said magnet to effect movement of the motor to engage the contact with the column, a second circuit to reverse the motor when the contact engages the column, and a two-way switch operated by the motor for connecting the magnet to the respective circuits.

21. A meter, comprising a shiftable medium variable in position with the force to be measured, a circuit including a reciprocating contact cooperating with said medium, a reversible motor for actuating said contact to engage and disengage said medium, means in said circuit to control the operation of the motor to separate the contact and medium immediately said elements have been engaged, and controllable auxiliary means to effect the operation of the motor in the opposite direction to engage the contact with the medium.

22. A meter, comprising a fluid column variable with the force to be measured, a circuit including a reciprocatory contact cooperating with said column, a reversible motor operating said meter and actuating said contact, means in said circuit to reverse the motor when the circuit is closed by said contact, and a second circuit including a switch to actuate said means to effect the operation of the motor to engage the contact with the column.

23. A meter, comprising a fluid column variable with the force to be measured, a reciprocatory rod carrying a contact cooperating with said column, a motor, gearing connecting the motor and the contact rod, a circuit closed through said contact and column and including means to effect a reversal of the contact by the motor when said circuit is closed between the contact and column, and controllable auxiliary means to effect movement of the motor in the opposite direction.

24. A meter, comprising a fluid column variable with the force to be measured, a reciprocatory contact rod cooperating with said column, a reversible motor, gearing connecting the motor with the rod, a circuit including the rod the column and means for reversing the motor when the rod engages the column, a second circuit including a timed circuit closure and said means for effecting the forward movement of said motor, and a totalizing register connected with the gearing by a one-way clutch.

25. A meter, comprising a fluid column variable with the force to be measured, a reciprocatory rod carrying a contact cooperating with said column, a reversible reciprocating motor, gearing connecting the motor and rod, means to effect reversal of the motor when the contact engages the column, controllable auxiliary means to effect forward movement of said motor, and a totalizing register operated through the gearing.

26. A meter, comprising a shaft, means for oscillating the shaft by and in accordance with the variations in the force to be measured, a cam plate connected to said shaft, a rock lever cooperating with the cam face of said plate to be actuated thereby, a one-way clutch operated by the rock lever, and an integrating meter actuated by said clutch.

27. A meter, comprising a shaft, means for oscillating the shaft by and in accordance with the variations in the fluid to be measured, a cam plate connected to said shaft, a rock lever cooperating with the cam face of said plate to be actuated thereby, a one-way clutch having its driving member connected to the rock lever, a pinion carried by the driven member of the clutch, and an integrating meter geared to said pinion.

28. A meter, comprising a shaft, means for oscillating the shaft by and in accordance with the variations in the fluid to be measured, a cam plate connected to said shaft and having a circular section and a shaped section on its edge, a rock lever fixed to a second oscillatory shaft with its free end cooperating with the edge of the cam plate to be actuated thereby, a one-way clutch having its driving member fixed to said second shaft, a pinion carried by the driven member of said clutch, an integrating meter geared to said pinion, and means for returning the rock lever to engagement with the cam plate.

29. A meter, comprising a shaft, means for oscillating the shaft by and in accordance with the variations in the fluid to be measured, a cam plate connected to said shaft and having a circular section and a shaped section on its edge, a rock lever fixed to a second oscillatory shaft with its free end cooperating with the edge of the cam plate to be actuated thereby, a one-way clutch having its driving member fixed to said second shaft, a pinion carried by the driven member of said clutch, a totalizing register geared to said pinion and means for returning the rock lever to engagement with the cam plate, said means comprising a flexible connection fixed to the rock lever at one end and anchored at a fixed point at its other end, and an abutment on the cam plate engaging the flexible connector to swing the rock lever in its return movement.

PAUL LANHAM.